J. Harvey.
Expansion Nut.

118238

PATENTED AUG 22 1871

Witnesses.
A. H. Gaylord
Hattie Holcomb

Inventor
Joseph Harvey.
Per Burridge & Co.
Atty's
Cleveland, O.

118,238

UNITED STATES PATENT OFFICE.

JOSEPH HARVEY, OF PAINESVILLE, OHIO.

IMPROVEMENT IN LOCK-NUTS.

Specification forming part of Letters Patent No. 118,238, dated August 22, 1871.

*To all whom it may concern:*

Be it known that I, JOSEPH HARVEY, of Painesville, in the county of Lake and State of Ohio, have invented a certain new and Improved Expansion Nut; and I do hereby declare that the following is a full, clear, and complete description of the same, reference being had to the accompanying drawing making part of this specification, in which—

Figure 1:
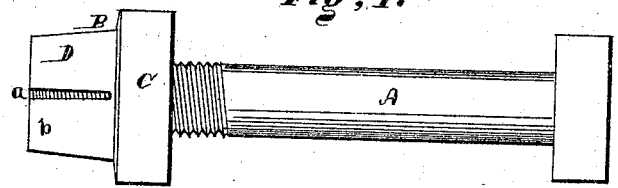
Figure 2:
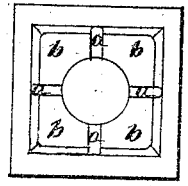
Figure 3:
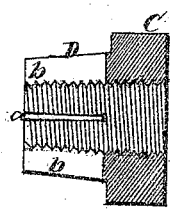

Figure 1 is a side view of the nut and bolt. Fig. 2 is an end view. Fig. 3 is a transverse section.

Like letters of reference denote like parts in the different views.

The object of this invention is to prevent the nut when screwed on the end of a bolt from working off. Said object is obtained by the use of a nut of considerable thickness, having a tapering thread therein, and which is also provided with one or more transverse slits, so that the outer end or side of the nut will expand on forcing the end of the bolt therein, and thereby hug closely the bolt, as hereinafter more fully described.

In the drawing, Fig. 1, A represents the bolt, which is or may be of the ordinary kind in use. B is the nut. Said nut is constructed with a broad square base, C, whereby it is turned onto the bolt. In connection therewith is formed a frustum, D, transversely, in which is cut slits *a* down to the base, as shown in the drawing. It will be observed that the screw in the frustum part of the nut, from the base outward, is slightly tapering, whereas that part in the base C is straight, as shown in Fig. 3.

The practical working of this nut is as follows: The screw on the bolt is straight; which on being screwed into the nut, the end thereof being of larger diameter than that part of the female screw in the frustum of the nut, will cause the corner sections *b* of the nut to expand by forcing therein the end of the bolt. The resistance offered by the corners to being forced outward or expanded by the nut causes them to hug tightly around the end thereof, which will hold the nut from turning, unless a wrench is applied for that purpose, whereas the tensive strain on the bolt is sustained by the base of the nut, and which is of the ordinary thickness.

I do not confine myself to the specified number of slits made in the nut, nor to their transverse direction, but adopt the number and direction shown in the drawing as the most effective, for the transverse direction gives more clamping strength to the nut than if made in any other any other direction.

What I claim as my invention, and desire to secure by Letters Patent, is—

The nut B, composed of the part C, having its screw-thread cut on its inner surface of equal diameter through its thickness, and the part D slotted, and the screw-thread of less diameter at its outer end than at its junction with part C, as shown and described.

JOSEPH HARVEY.

Witnesses:
J. H. BURRIDGE,
D. L. HUMPHREY.